UNITED STATES PATENT OFFICE.

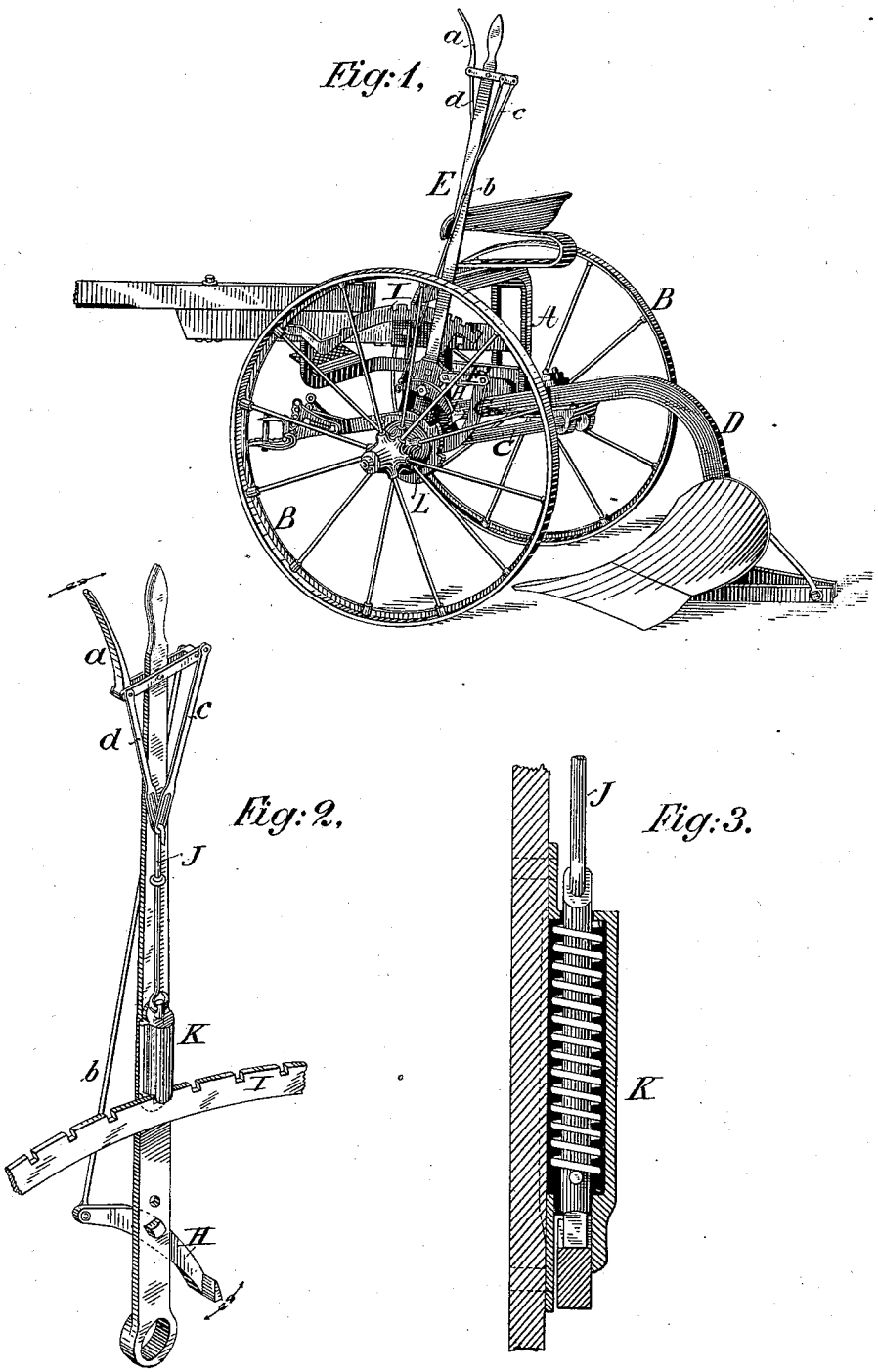

CHARLES E. KNEBERG, OF MOLINE, ILLINOIS, ASSIGNOR OF TWO-THIRDS TO THE MOLINE PLOW COMPANY, OF SAME PLACE.

SULKY-PLOW.

SPECIFICATION forming part of Letters Patent No. 254,555, dated March 7, 1882.

Application filed January 3, 1882. (No model.)

*To all whom it may concern:*

Be it known that I, CHARLES EMANUEL KNEBERG, of Moline, in the county of Rock Island and State of Illinois, have invented certain Improvements in Sulky-Plows, of which the following is a specification.

My invention relates to a mechanical movement applicable to sulky-plows, horse-rakes, and grain-drills, and similar implements, but more particularly adapted for use on that class of wheeled or sulky plows in which means are provided for elevating the plow through the action of the ground-wheels or by hand, at the will of the operator; and it consists in combining with the hand-lever a single latch or finger piece, so arranged that by moving it in opposite directions it will serve to unlock the main lever alone, or to unlock the main lever and also operate the pawl, through which automatic lifting of the plow is effected.

The invention consists broadly in a single latch or lever arranged to serve the double function named, and the device is susceptible of modification in its form and embodiment without departing from the limits of my invention.

In the class of implements above named the elevation of the plow is effected through the instrumentality of a lever which may be operated by hand, or by means of a pawl attached to it from a ratchet-wheel on the main axle of the machine. The hand-lever is provided with a dog for locking it in different positions and to secure the proper adjustment of the plow, and is also provided with the before-mentioned pawl, which is engaged with the ratchet-wheel whenever the automatic lifting of the plow is to be effected. It is therefore necessary to provide the hand-lever with means whereby the locking device may be operated, either independently or in connection with the lifting-pawl, and this in such manner that the operator may control the same with one hand at the same time that he controls the position of the main lever. Heretofore the result has been accomplished by providing the main or hand lever with two separate independent latches. This construction was complicated, expensive, liable to derangement, and inconvenient in operation. It is to overcome these difficulties that my invention is designed.

Referring to the accompanying drawings, Figure 1 represents a perspective view of an ordinary sulky-plow provided with my improved lever and connection; Fig. 2, a perspective view of the lever. Fig. 3 is a vertical section of the hand-lever, the rack-bar, and the dog for locking the same.

Referring to the drawings, A represents the arched frame of the plow, sustained at its ends upon traction-wheels B, and provided at the middle with a cranked frame, C, upon which the beam of the plow D is mounted.

E represents an upright hand-lever mounted loosely around one end of the axle, and connected by a link, F, to an arm, G, secured upon one end of the plow-supporting crank C, so that by moving the lever forward the crank-frame is turned upward and the plow lifted from the ground.

In order to effect the operation of the hand-lever automatically by means of a draft-wheel, one of the wheels D is provided with a ratchet-wheel, L, and the lever provided near its lower end with a pawl, H. This pawl stands normally out of contact with the ratchet-wheel, but may be engaged therewith at will, whereupon motion will be transmitted from the traction-wheel through the ratchet-wheel and pawl to the lever E, moving the lever forward, and thereby raising the plow through the draft or traction of the machine.

In order to hold the plow when elevated, and to limit the depth to which it enters the ground, a stationary rack-bar, I, is attached to one side of the frame, and a sliding dog or catch, K, mounted upon the lever under the control of the attendant and arranged to engage with the rack-bar, in order to hold the lever in position.

The above parts are of substantially the ordinary construction, and constitute no part of my invention.

I will now describe the features which I have added.

Near the upper end of the hand-lever I pivot thereto a transverse finger-lever, *a*, having its forward end turned upward in such position that it may be readily grasped by the attendant at the same time that he holds the main lever. To the rear end of the finger-lever *a*, I pivot a rod, *b*, which is extended downward and pivoted to the forward end of the lifting-pawl H, as shown in Figs. 1 and 2, so that the attendant by simply pushing the finger-lever forward may throw the pawl downward into engagement with the ratchet-wheel and thereby cause the automatic elevation of the plow.

For the purpose of operating the vertical sliding dog K, by which the main lever is locked, I pivot two rods, *c* and *d*, to opposite ends of the finger-lever, and, extending them downward by the side of the hand-lever, slot their lower ends vertically and mount them both upon the upper hooked end of a rod or spindle, J, secured to the locking-bolt.

As shown in Fig. 3, the locking-bolt is mounted within a guide and surrounded by a spiral spring which tends to urge it downward to a locked position. When the bolt is thus held downward its stem J bears in the lower ends of the slots in rods *c d*, as plainly represented in Fig. 2. Under this position of the parts the hand-lever is locked rigidly in position and the lifting-pawl sustained in an elevated position clear of the ratchet-wheel. If now the finger-lever be thrown forward, the rod *d* will remain idle, while the rod *c* will unlock the dog K and release the hand-lever, and at the same time, through the rod *b*, cause the pawl H to engage with the ratchet-wheel so that the latter will effect the lifting of the plow. If, however, instead of throwing the finger-lever forward it be thrown backward toward the hand-lever, the rods *c* and *b* will remain inoperative, and the rod *d* will raise the dog K, unlocking the hand-lever and permitting the same to be thrown forward by hand to effect the elevation of the plow.

From the above description it will be seen that the single finger-lever *a* serves, when moved in one direction, to simply unlock the hand-lever, and, when moved in the opposite direction, to unlock the hand-lever and also throw the lifting-pawl into engagement.

While it is preferred to adhere to substantially the details of construction represented in the drawings, it will be manifest to the skilled mechanic that they may be modified in many details without essentially changing the mode of action or departing from the substance of the invention.

Instead of slotting the lower ends of the rods *c d*, they may be provided on their lower ends with heads or enlargements and arranged to slide loosely through an eye in the upper end of the stem L or the locking-dog K.

The locking-dog K may be modified in construction, as desired, as may also the pawl or engagement with the ratchet-wheel or other lifting mechanism that may be employed.

It is obvious that in place of the pawl upon the lever to engage with the ratchet-wheel, a sliding dog or equivalent device may be employed.

Having thus described my invention, what I claim is—

1. In a plow, the combination, with the hand-lever, of a pawl, a locking device for the lever, and a finger-lever attached to the hand-lever and connected with the pawl and locking devices, substantially as described, so that upon being moved in one direction the finger-lever operates the locking device only, and upon being moved in the opposite direction it operates both the locking device and the pawl.

2. In combination with the hand-lever, its locking device and pawl, the pivoted finger-lever connected at one end with the pawl and at both ends with the locking device, substantially as described, whereby the finger-lever is adapted to operate the pawl alone or both the pawl and the locking device, according as it is moved in one direction or the other.

3. In combination with the hand lever, a finger-lever adapted to swing in opposite directions from its normal position, a locking device for the lever, a lifting-pawl attached to the lever, a connection, substantially such as described, extending from the finger-lever to the pawl, and double connection from the finger-lever to the locking device.

4. In combination with the stationary rack-bar, the hand-lever, its pawl, the locking device mounted upon the lever and engaging with the rack-bar, the central pivoted finger, the lever, the rod *b*, and the slotted rods *c d*.

CHARLES EMANUEL KNEBERG.

Witnesses:
EUGENE LEWIS,
E. A. WRIGHT.